United States Patent
Chen

(10) Patent No.: US 9,473,670 B2
(45) Date of Patent: Oct. 18, 2016

(54) PERIPHERAL WITH IMAGE PROCESSING FUNCTION

(71) Applicant: AVISION INC., Hsinchu (TW)

(72) Inventor: Yen-Cheng Chen, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/687,662

(22) Filed: Apr. 15, 2015

(65) Prior Publication Data

US 2015/0319336 A1    Nov. 5, 2015

(30) Foreign Application Priority Data

Apr. 30, 2014    (TW) .............................. 103115463 A

(51) Int. Cl.
*H04N 1/04* (2006.01)
*H04N 1/387* (2006.01)
*H04N 1/409* (2006.01)

(52) U.S. Cl.
CPC ............ *H04N 1/3872* (2013.01); *H04N 1/409* (2013.01)

(58) Field of Classification Search
CPC ........................... H04N 1/3872; H04N 1/409
USPC .................. 358/474, 498, 497, 496
See application file for complete search history.

(56) References Cited

U.S. PATENT DOCUMENTS

| | | | | |
|---|---|---|---|---|
| 6,078,051 A | * | 6/2000 | Banton | G01N 21/3563 250/341.1 |
| 6,944,355 B2 | * | 9/2005 | Lupien, Jr. | H04N 1/387 358/3.26 |
| 2006/0268367 A1 | * | 11/2006 | Hayashide | H04N 1/02865 358/474 |

FOREIGN PATENT DOCUMENTS

CN        101035183 A    9/2007

\* cited by examiner

*Primary Examiner* — Houshang Safaipour

(57) ABSTRACT

A peripheral includes a scanning module and a control processing module. In a restoration mode, the scanning module performs a one-time scan operation on a punched document to obtain a visible light image and an infrared image. The infrared image includes an infrared hole image corresponding to one hole or multiple holes of the punched document. The visible light image includes a visible light hole image corresponding to one hole or multiple holes of the punched document. In the restoration mode, the control processing module, electrically connected to the scanning module, determines the infrared hole image according to the infrared image, determines the visible light hole image according to the infrared hole image and processes the visible light image into a final image according to the visible light hole image, wherein the final image does not contain the visible light hole image.

14 Claims, 5 Drawing Sheets

PERIPHERAL WITH IMAGE PROCESSING FUNCTION

This application claims priority of No. 103115463 filed in Taiwan R.O.C. on Apr. 30, 2014 under 35 USC 119, the entire content of which is hereby incorporated by reference.

BACKGROUND OF THE INVENTION

1. Field of the Invention

The present invention relates in general to a peripheral, and more particularly to a peripheral with an image processing function.

2. Related Art

A conventional scanner can scan a punched document with holes, but result in the black images corresponding to the holes after scanning. If this image is to be printed, a lot of toners are wasted in printing the black hole image. Although the black images can be removed with image processing software which is not very precise and occupying performance, it is not only time-consuming for users but also being a huge obstacle to users who is not good at using computers.

On the other hand, the preview scan can be utilized to set a boundary to prevent the holes or a damaged portion from being scanned. However, information near the holes or the damaged portion cannot be scanned, and thus an original cannot be completely represented.

Furthermore, when scanning an original, such as a card or a special model with a special external shape, a scanned result is still shown in a rectangular image, and the external shape of the original cannot be truly represented.

SUMMARY OF THE INVENTION

Accordingly, the present invention has been proposed to solve the problems of the prior art, and an object of the present invention is to provide a peripheral with an image processing function for repairing and restoring an original with a hole or the damaged original, or even truly representing an external shape of the original.

To achieve the above-identified object, the present invention provides a peripheral including a scanning module and a control processing module. The scanning module performs a one-time scan operation on a punched document to obtain a visible light image and an infrared image in a restoration mode. The infrared image comprises an infrared hole image corresponding to one hole or multiple holes of the punched document, and the visible light image comprises a visible light hole image corresponding to the one hole or multiple holes of the punched document. The control processing module is electrically connected to the scanning module. In the restoration mode, the control processing module determines the infrared hole image according to the infrared image, determines the visible light hole image according to the infrared hole image, and processes the visible light image into a final image according to the visible light hole image, wherein the final image does not contain the visible light hole image.

In addition, the present invention further provides a peripheral including a scanning module and a control processing module. The scanning module performs a one-time scan operation on a shaped document to obtain a visible light image and an infrared image in an original representing mode, wherein the infrared image comprises periphery information corresponding to a periphery of the shaped document. The control processing module is electrically connected to the scanning module. In the original representing mode, the control processing module processes the visible light image into a final image according to the periphery information, wherein the final image represents the periphery of the shaped document instead of a periphery set by a user.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to accompanying drawings.

In an embodiment of the present invention, whether the document has a hole or is damaged is recognized according to the property that the infrared light cannot easily transmit through the sheet, and performs the image restoration accordingly. The adopted technology is to scan the document using the infrared light and the visible light in a one-time scan operation (or concurrently). If the infrared sensor receives the infrared optical signal, it represents that the corresponding point or portion is broken through. Thus, it is unnecessary to estimate the position of the hole by the complicated image processing.

Figure 1:
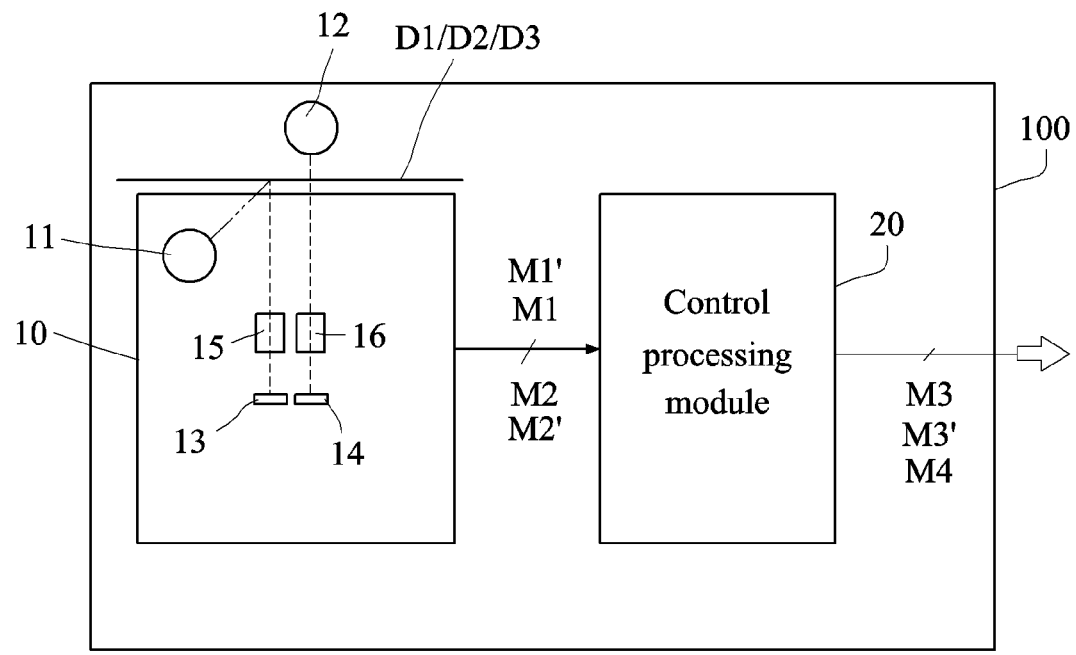
FIG. 1 is a schematic view showing a peripheral according to a preferred embodiment of the present invention.

FIG. 1 is a schematic view showing a peripheral 100 according to a preferred embodiment of the present invention. Referring to FIG. 1, the peripheral 100 of this embodiment includes a scanning module 10 and a control processing module 20, and may have multiple operation modes, which include, for example but without limitation to, a restoration mode, a normal mode, an original representing mode and the like.

The scanning module 10 includes a visible light source 11, an infrared light source 12, a visible light sensor 13, an infrared sensor 14 and lenses 15 and 16. In the arrangement of FIG. 1, the visible light source 11 outputs visible light to illuminate the document D1/D2/D3, the visible light sensor 13 receives light rays, reflected by the document D1/D2/D3, through the lens 15 to obtain a scan image. The infrared light source 12 outputs the infrared light to illuminate the document D1/D2/D3, and the infrared sensor 14 receives light rays, transmitted through the document D1/D2/D3, through the lens 16 to obtain another scan image. In this embodiment, the used documents are reflective documents, rather than the transparent documents, such as a film, a slide and the like.

FIGS. 2 to 5 are schematic views showing a punched document D1, a visible light image M1, an infrared image M2 and a final image M3, respectively. Referring to FIGS. 1 to 5, in the restoration mode, the scanning module 10 performs a one-time scan operation on the punched document D1 to obtain a visible light image M1 and an infrared image M2. The so-called one-time scan operation means that the scanning module only moves back and forth once, or the sheet-feeding mechanism (not shown) only transports the document once. The punched document D1 includes, but without limitation to, the document punched by a machine or a tool, a loose-leaf paper or a damaged document. Herein, the document punched with three holes by the machine is described as an example.

Figure 2:
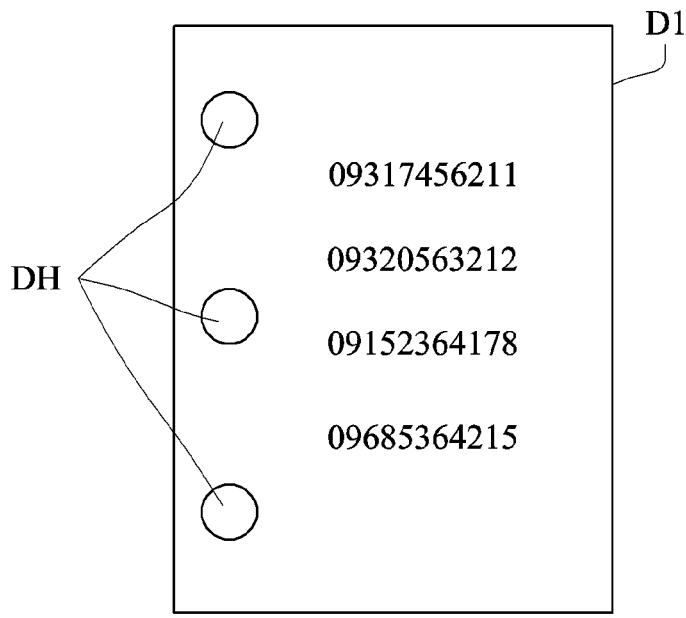
FIG. 2 is a schematic view showing a punched document.
Figure 4:
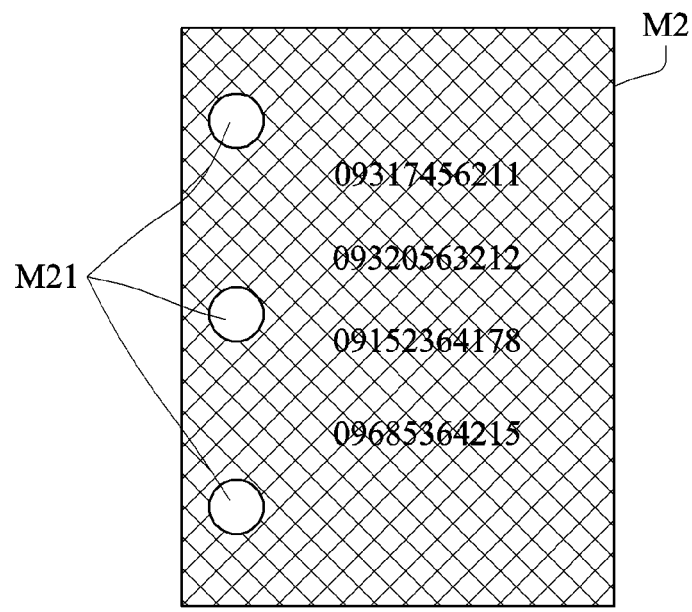
FIG. 4 is a schematic view showing an infrared image.

Referring to FIGS. 2 and 4, the infrared image M2 includes an infrared hole image M21 corresponding to one hole or multiple holes DH of the punched document D1. According to the scanning module 10 of this embodiment, the infrared light can transmit through the hole DH from top to bottom, so that the hole of the infrared hole image M21 represents the relatively bright hole pattern, or that the light amount captured by the infrared sensor 14 immediately reaches the saturation state. Regarding the other portion, it is difficult for the infrared light to transmit through the document D1, so the other portion represents the relatively dark image, or even the black image. This can be determined according to the thickness of the punched document D1 and the intensity of the infrared light. So, it is to be noted that FIG. 4 only schematically shows the relative position of the infrared hole image M21 without particularly restricting the present invention.

Figure 3:
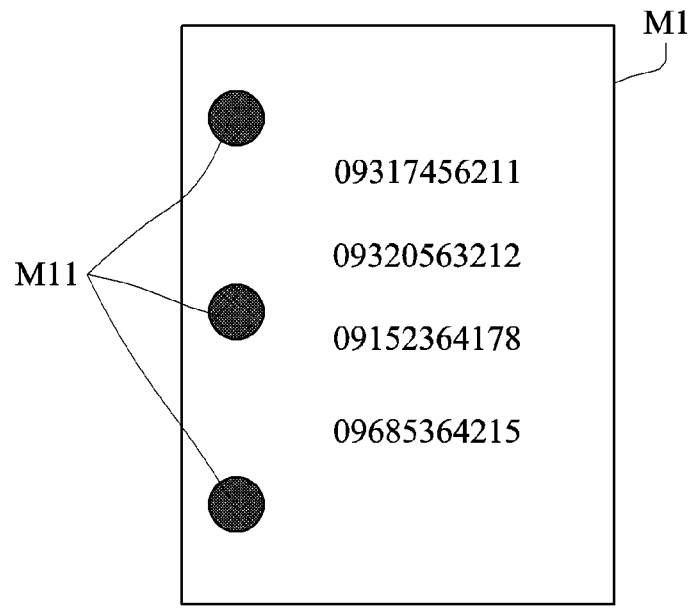
FIG. 3 is a schematic view showing a visible light image.

As shown in FIGS. 2 and 3, the visible light image M1 includes a visible light hole image M11 corresponding to one hole or multiple holes DH of the punched document D1. According to the scanning module 10 of this embodiment, the hole DH and the portion printed with a text or a pattern cannot completely reflect the visible light to the visible light sensor 13, so that the hole of the visible light hole image M11 and the portion printed with the text or pattern represents the relatively dark pattern. The other portion represents the relatively bright image.

Figure 5:
FIG. 5 is a schematic view showing a final image.

In the restoration mode, the control processing module 20, electrically connected to the scanning module 10, determines the infrared hole image M21 according to the infrared image M2, determines the visible light hole image M11 according to the infrared hole image M21, and processes the visible light image M1 into a final image M3 according to the visible light hole image M11. The final image M3 does not contain the visible light hole image M11, as shown in FIG. 5. Because the brightness, which is corresponding to the infrared hole image M21 and sensed by the infrared sensor 14, almost reaches the saturation state, it is very easy to distinguish the infrared hole image M21 from other non-hole image. So, it is possible to determine the visible light hole image M11 corresponding to the visible light image M1 without the complicated calculation. For example, the brightness of the infrared hole image M21 usually reaches the maximum value ranging from 250 to 255. On the contrary, the optical path of the visible light image M1 is formed by the reflection, and either the hole image or the non-hole image does not reach the extreme value. Thus, the location of the hole can be determined as long as the maximum value is reached, and it is unnecessary to perform the conventional back-end image processing to make the distinguishing. That is, the control processing module 20 determines the location of the infrared hole image M21 (or internal periphery of the document) by judging whether the brightness of the infrared image M2 reaches the maximum value. Thus, the spirit of the present invention is to use the infrared sensor 14, the infrared image M2 and the infrared hole image M21 in conjunction with the visible light image M1 to determine the hole image M11, and to further perform the image restoration to obtain the result expected by the user.

In this embodiment, the control processing module 20 turns on the visible light source 11 and the infrared light source 12 to output the visible light and the infrared light to the punched document D1, and controls the visible light sensor 13 and the infrared sensor 14 to sense the visible light and the infrared light coming from the punched document D1 during the one-time scan operation to obtain the visible light image M1 and the infrared image M2 respectively. In this embodiment, the control processing module 20 outputs the visible light image M1 and the final image M3 at one time. That is, the user can obtain the visible light image M1 and the final image M3 without performing any advanced setting.

It is worth noting that although the visible light sensor 13 and the infrared sensor 14 shown in FIG. 1 are disposed in the separated state and the lenses 15 and 16 are disposed in the separated state, it is also possible to integrate the visible light sensor 13 and the infrared sensor 14 together, and to integrate the lenses 15 and 16 into one single lens. For example, the black-and-white sensing pixels of the color image sensor function as the infrared sensor 14, and the red, green and blue sensing pixels of the color image sensor function as the visible light sensor 13. This will be described later.

Figure 6:
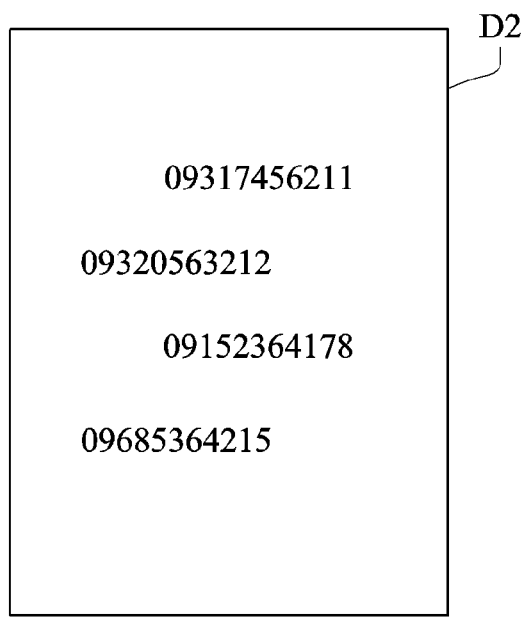
FIG. 6 is a schematic view showing a hole-free document.
Figure 7A:
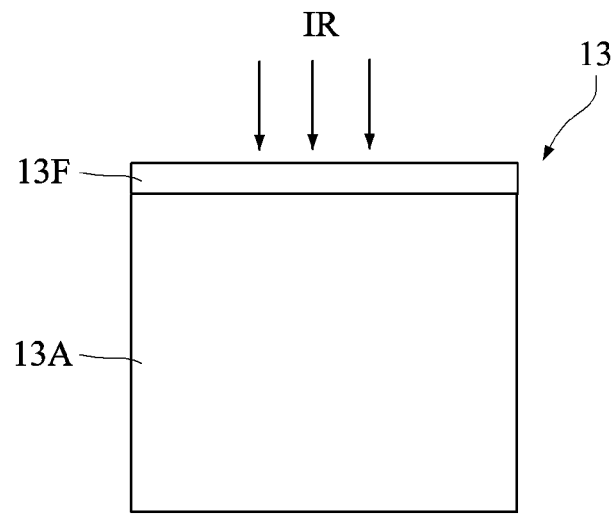
FIG. 7A is a schematic view showing a visible light sensor.

FIG. 6 is a schematic view showing a hole-free document D2, wherein the alignment pattern of the numbers is different from that of the punched document D1 of FIG. 2 to show that the document D2 is different from the document D1 only. FIG. 7A is a schematic view showing the visible light sensor 13. In the normal mode of the peripheral 100, the infrared sensor 14 may sense the black-and-white image of the hole-free document D2. For the purpose of the applications to the restoration mode and the normal mode, the visible light sensor 13 may be configured to sense the red, green and blue images of the hole-free document D2 in the normal mode. To achieve the above-mentioned object, the visible light sensor 13 preferably has an infrared light filter 13F to stop the infrared light from entering a sensing portion 13A of the visible light sensor 13.

Figure 7B:
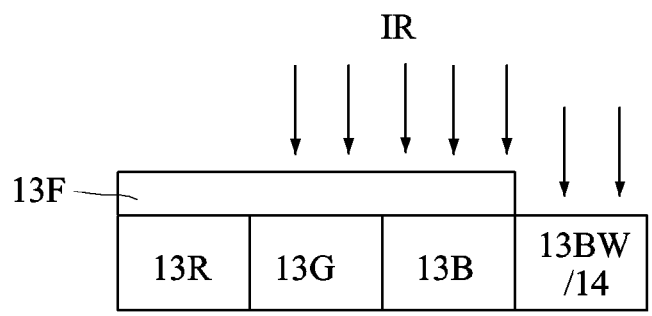
FIGS. 7B and 7C are schematic views showing two examples of visible light sensors and infrared sensors.
Figure 7C:
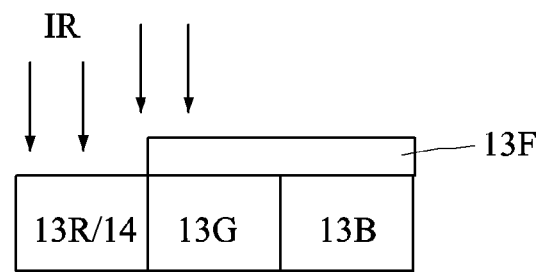

In the following, a color charge-coupled device (CCD) type image sensor will be described as an example to show how to implement the present invention. FIGS. 7B and 7C are schematic views showing two examples of the visible light sensor 13 and the infrared sensor 14. In FIG. 7B, the image sensor has black-and-white, red, green and blue sensing pixels 13BW, 13R, 13G and 13B. The black-and-white sensing pixel 13BW functions as the infrared sensor 14, so there is no infrared light filter 13F covering the black-and-white sensing pixel 13BW. The red, green and blue sensing pixels 13R, 13G and 13B function as the visible light sensor 13, and are thus covered with the infrared light filter 13F to stop the infrared light from entering the red, green and blue sensing pixels 13R, 13G and 13B, wherein the above-mentioned configuration is provided for the operation in the restoration mode. On the other hand, when the sensor is to be used in the normal mode, the black-and-white, red, green and blue sensing pixels 13BW, 13R, 13G and 13B may be used to sense the black-and-white, red, green and blue light rays to obtain the color image signal.

In addition, the color image sensor of FIG. 7C does not have the black-and-white sensing pixel, and only has the red, green and blue sensing pixels 13R, 13G and 13B. The red sensing pixel 13R also functions as the infrared sensor 14 to sense the infrared image in the restoration mode, and is thus not shielded by the infrared light filter 13F. The black image obtained in the normal mode, is synthesized from the sensing results of the red, green and blue sensing pixels. So, in this example, the infrared sensor 14 senses the red image of the hole-free document D2, and the visible light sensor 13 senses the red, green and blue images of the hole-free document D2 in the normal mode of the peripheral 100.

Figure 8:
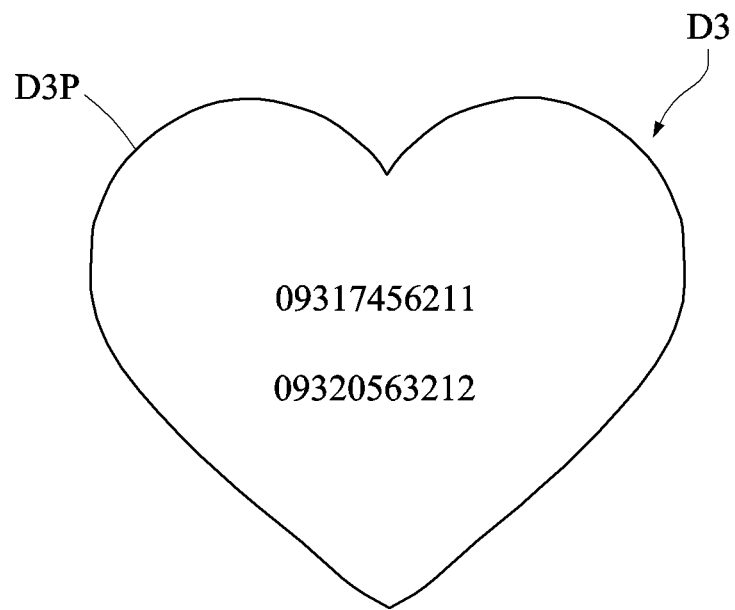
FIG. 8 is a schematic view showing a shaped document.

In addition, in order to truly represent the pattern of the original, the embodiment of the present invention further provides an original representing mode. FIG. 8 is a schematic view showing a shaped document D3. Referring to FIGS. 8 and 1, the scanning module 10 further performs a second one-time scan operation on the shaped document D3 in the original representing mode to obtain a second visible light image M1' and a second infrared image M2', wherein the second infrared image M2' includes periphery information corresponding to a periphery D3P of the shaped document D3. In the original representing mode, the control processing module 20 further turns on the visible light source 11 and the infrared light source 12 to output the visible light and the infrared light to the shaped document D3 in the one-time scan operation, and controls the visible light sensor 13 and the infrared sensor 14 to sense the visible light and the infrared light, coming from the shaped document D3, to obtain the second visible light image M1' and the second infrared image M2', respectively. Next, the control processing module 20 processes the second visible light image M1' into a second final image M3' according to the periphery information, wherein the second final image M3' represents the periphery D3P of the shaped document D3 instead of the periphery set by a user. Therefore, even if the user sets the rectangular periphery, scanning the heart-shaped shaped document D3 in the original representing mode obtains the heart-shaped profile, which is different from and dissimilar to the rectangular periphery. Thus, the user can properly record the document with the special external shape without the subsequent image processing being performed.

Figure 9:
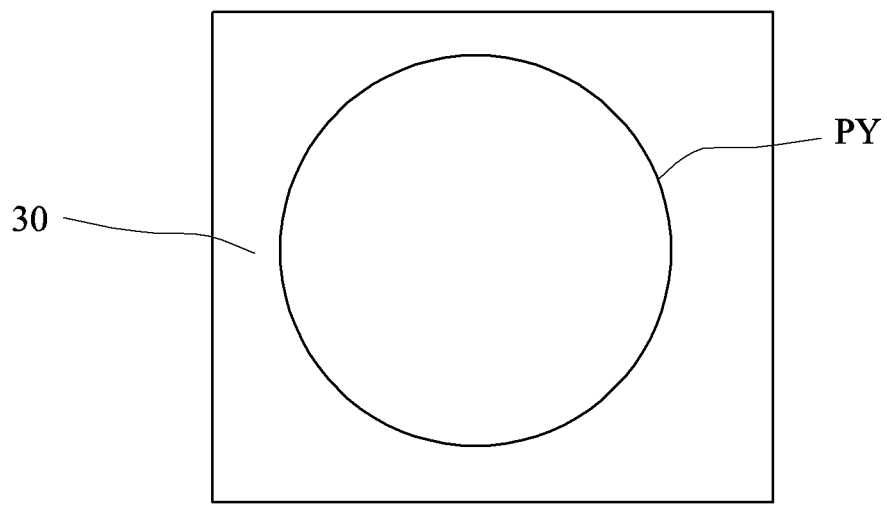
FIG. 9 is a schematic view showing a displaying image of the shaped document on a display.

FIG. 9 is a schematic view showing a displaying frame of the shaped document on a display 30. As shown in FIGS. 9 and 1, the display 30 is electrically connected to the control processing module 20. In the normal mode, the user can set a periphery PY on the display 30, and the control processing module 20 processes the visible light image M1 into an ordinary image M4 according to the periphery PY set by the user, so that the ordinary image M4 represents the periphery set by the user. That is, the user can set the circular periphery PY to make the ordinary image M4 represent the circular periphery.

Although the image corresponding to the hole is cleared into white in the restoration mode, the image corresponding to the hole may also be converted into the gray scale image in another embodiment to decrease the usage of the toner with the distributed positions of the holes being marked. Alternatively, the image corresponding to the hole is converted into the pattern representative of the periphery of the hole, such as the pattern having the circular shape, the star shape or the like. Furthermore, the peripheral 100 of FIG. 1 may further include a printing module (not shown) for receiving the image M3/M3'/M4 and outputting a printed result.

In summary, the control processing module of the invention determines periphery information according to the infrared image, and processes the visible light image into a final image according to the periphery information corresponding to a periphery of the document. To process the punched document, the periphery information corresponds to an internal periphery (the periphery of the hole) of the document. To process the punched document, the periphery information corresponds to an external periphery (the external shape of the hole) of the document.

With the embodiment of the present invention, the infrared light sensing can be utilized to save the time and loading for the calculation of the system, and achieve the good image restoration effect conveniently and rapidly. Also, the embodiment is applicable to the normal mode and the original representing mode.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A peripheral, comprising:
   a scanning module performing a one-time scan operation on a punched document to obtain a visible light image and an infrared image in a restoration mode, wherein the infrared image comprises an infrared hole image corresponding to one hole or multiple holes of the punched document, and the visible light image comprises a visible light hole image corresponding to the one hole or multiple holes of the punched document; and
   a control processing module electrically connected to the scanning module, wherein in the restoration mode, the control processing module determines the infrared hole image according to the infrared image, determines the visible light hole image according to the infrared hole image, and restores the visible light image into a final image according to the visible light hole image, wherein the final image does not contain the visible light hole image, wherein the control processing module determines a location of the infrared hole image by judging whether a brightness of the infrared image reaches a maximum value.

2. The peripheral according to claim 1, wherein the scanning module comprises:
   a visible light source and an infrared light source; and
   a visible light sensor and an infrared sensor, wherein the control processing module turns on the visible light source and the infrared light source to output visible light and infrared light to the punched document, and controls the visible light sensor and the infrared sensor to sense visible light and infrared light coming from the punched document during the one-time scan operation to obtain the visible light image and the infrared image respectively.

3. The peripheral according to claim 2, wherein the infrared sensor senses a black-and-white image of a hole-free document in a normal mode of the peripheral, and the visible light sensor senses red, green and blue images of the hole-free document in the normal mode.

4. The peripheral according to claim 3, wherein the visible light sensor has an infrared light filter to stop the infrared light from entering a sensing portion of the visible light sensor.

5. The peripheral according to claim 2, wherein the infrared sensor senses a red image of a hole-free document in a normal mode of the peripheral, and the visible light sensor senses the red, green and blue images of the hole-free document in the normal mode.

6. The peripheral according to claim 1, wherein the control processing module outputs the visible light image and the final image at one time.

7. The peripheral according to claim 1, wherein:
the scanning module further performs a second one-time scan operation on a shaped document to obtain a second visible light image and a second infrared image in an original representing mode, wherein the second infrared image comprises periphery information corresponding to a periphery of the shaped document; and
the control processing module further processes the second visible light image into a second final image according to the periphery information in the original representing mode, wherein the second final image represents the periphery of the shaped document, and does not represent a periphery set by a user.

8. A peripheral, comprising:
a scanning module performing a one-time scan operation on a shaped document to obtain a visible light image and an infrared image in an original representing mode, wherein the infrared image comprises periphery information corresponding to a periphery of the shaped document; and
a control processing module electrically connected to the scanning module, wherein in the original representing mode, the control processing module processes the visible light image into a final image according to the periphery information, wherein the final image represents the periphery of the shaped document and does not represent a periphery set by a user, wherein the periphery of the shaped document is dissimilar to the periphery set by the user.

9. The peripheral according to claim 8, wherein the scanning module comprises:
a visible light source and an infrared light source; and
a visible light sensor and an infrared sensor, wherein in the one-time scan operation, the control processing module turns on the visible light source and the infrared light source to output visible light and infrared light to the shaped document, and controls the visible light sensor and the infrared sensor to sense visible light and infrared light, coming from the shaped document to obtain the visible light image and the infrared image, respectively.

10. The peripheral according to claim 9, wherein in a normal mode of the peripheral, the control processing module processes the visible light image into an ordinary image according to a periphery set by the user, wherein the ordinary image represents the periphery set by the user.

11. The peripheral according to claim 8, wherein the control processing module outputs the visible light image and the final image at one time.

12. A peripheral, comprising:
a scanning module performing a one-time scan operation on a document to obtain a visible light image and an infrared image; and
a control processing module electrically connected to the scanning module, wherein the control processing module determines periphery information according to the infrared image, and processes the visible light image into a final image according to the periphery information corresponding to a periphery of the document, wherein the control processing module determines a location of the periphery by judging whether a brightness of the infrared image reaches a maximum value.

13. The peripheral according to claim 11, wherein the periphery information corresponds to an external periphery of the document.

14. The peripheral according to claim 11, wherein the periphery information corresponds to an internal periphery of the document.

* * * * *